United States Patent
Lin

(10) Patent No.: US 7,829,167 B2
(45) Date of Patent: Nov. 9, 2010

(54) DISC HAVING RELIEF PATTERN AND TRANSPRINT METHOD THEREOF

(75) Inventor: Chih-Hsun Lin, Taipei County (TW)

(73) Assignee: Benq Materials Corp., Gueishan Township, Taoyuan County (TW)

( * ) Notice: Subject to any disclaimer, the term of this patent is extended or adjusted under 35 U.S.C. 154(b) by 505 days.

(21) Appl. No.: 11/930,243

(22) Filed: Oct. 31, 2007

(65) Prior Publication Data

US 2009/0017270 A1 Jan. 15, 2009

(30) Foreign Application Priority Data

Jul. 11, 2007 (TW) .............................. 96125291 A

(51) Int. Cl.
*B32B 3/02* (2006.01)

(52) U.S. Cl. .................... 428/64.1; 428/64.4; 428/64.8; 430/270.14

(58) Field of Classification Search ........................ None
See application file for complete search history.

(56) References Cited

U.S. PATENT DOCUMENTS

| | | | | |
|---|---|---|---|---|
| 5,316,464 A | * | 5/1994 | Lexell | ........................ 425/318 |
| 5,346,654 A | * | 9/1994 | Kodaka et al. | .............. 264/1.33 |
| 5,854,175 A | * | 12/1998 | DeBoer et al. | ............... 503/227 |
| 2004/0170116 A1 | * | 9/2004 | Moloo et al. | .............. 369/275.4 |
| 2007/0092837 A1 | * | 4/2007 | Taugher et al. | ......... 430/270.11 |

* cited by examiner

*Primary Examiner*—Elizabeth Mulvaney
(74) *Attorney, Agent, or Firm*—Thomas, Kayden, Horstemeyer & Risley

(57) ABSTRACT

A disc having a relief pattern and a transprint method thereof are provided. The transprint method for transprinting the relief pattern on a substrate of the disc includes the following steps. First, a transprint template is provided. A first surface of the transprint template has a complementary pattern corresponding to the relief pattern. Next, a pattern layer is formed on the substrate. Then, the transprint template is placed on and covers the pattern layer until the first surface of the transprint template closely contacts a second surface of the pattern layer, so that the relief pattern is formed on the second surface. Afterward, the pattern layer is cured by irradiation. Later, the transprint template is removed for exposing the second surface with the relief pattern.

15 Claims, 8 Drawing Sheets

100 ns # US 7,829,167 B2

DISC HAVING RELIEF PATTERN AND TRANSPRINT METHOD THEREOF

This application claims the priority date of Taiwan application Serial No. 96125291, filed Jul. 11, 2007, the subject matter of which is incorporated herein by reference.

BACKGROUND OF THE INVENTION

1. Field of the Invention

The invention generally relates to a disc having a relief pattern and a transprint method thereof, and more particularly to a disc having a relief pattern and a transprint method thereof on a printing surface of a disc.

2. Description of the Related Art

Screen-printing is commonly used in disc surface printing. A stencil with micro-holes corresponding to a pattern is used in screen-printing. Generally, the stencil is placed over a printing surface. When applied to the stencil, ink passes through the fine holes onto the printing surface. However, UV ink used in disc surface printing is expensive, and the pattern formed on the disc is flat and dull. As a result, those disc printed by screen-printing can not motivate consumers to buy the discs. Therefore, it is important to form a relief pattern on disc surface for increasing visual enjoyment. Also, the printing cost needs to be decreased in order to stimulate consumers' motivation in purchasing discs.

SUMMARY OF THE INVENTION

The invention is related to a disc having a relief pattern and a transprint method thereof. The relief pattern is transprinted onto the substrate of the disc through a transprint template.

According to a first aspect of the present invention, a transprint method for transprinting a relief pattern to a substrate of a disc is provided. The method includes following steps. First, a transprint template is provided. A first surface of the transprint template has a complementary pattern corresponding to the relief pattern. Next, a pattern layer is formed on the substrate. Then, the transprint template is place on the pattern layer until the first surface of the transprint template closely contacts a second surface of the pattern layer, so that the relief pattern is formed on the second surface. Afterward, the pattern layer is cured by irradiation. Later, the transprint template is removed for exposing the second surface having the relief pattern.

According to a second aspect of the present invention, a disc having a relief pattern is provided. The disc includes a recording layer, a substrate and a pattern layer. The substrate is disposed on the recording layer. The pattern layer is disposed on the substrate. The pattern layer has a surface with different thickness for forming the relief pattern.

The invention will become apparent from the following detailed description of the preferred but non-limiting embodiments. The following description is made with reference to the accompanying drawings.

DETAILED DESCRIPTION OF THE INVENTION

Figure 1A:
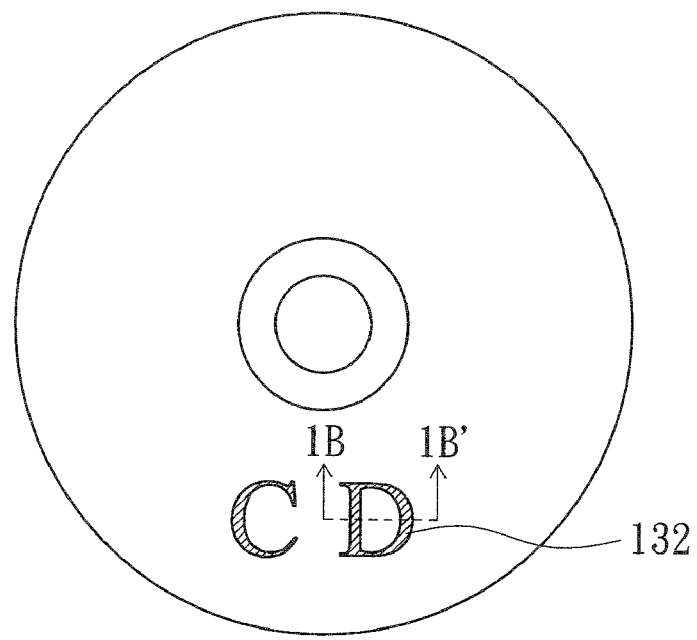
FIG. 1A is a top view of a disc having a relief pattern according to the preferred embodiment of the present invention.
Figure 1B:
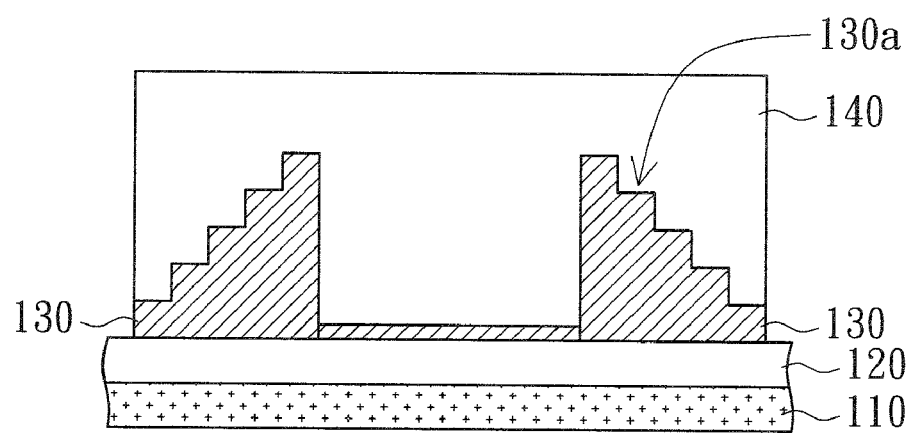
FIG. 1B is a cross-sectional view of the disc in FIG. 1A along a cross-sectional line 1B-1B'.

Please refer to FIGS. 1A~1B at the same time. FIG. 1A is a top view of a disc having a relief pattern according to the preferred embodiment of the present invention. FIG. 1B is a cross-sectional view of the disc in FIG. 1A along a cross-sectional line 1B-1B'. The disc 100 having a relief pattern 132 includes a recording layer 110, a substrate 120, a pattern layer 130 and a protection layer 140. The substrate 120 is disposed on the recording layer 110. The pattern layer 130 is disposed on the substrate 120. The pattern layer 130 has a surface 130a with different thickness for forming the relief pattern 132. The protection layer 140 is coated on the pattern layer 130 for protecting the relief pattern 132.

First Embodiment

Figure 2:
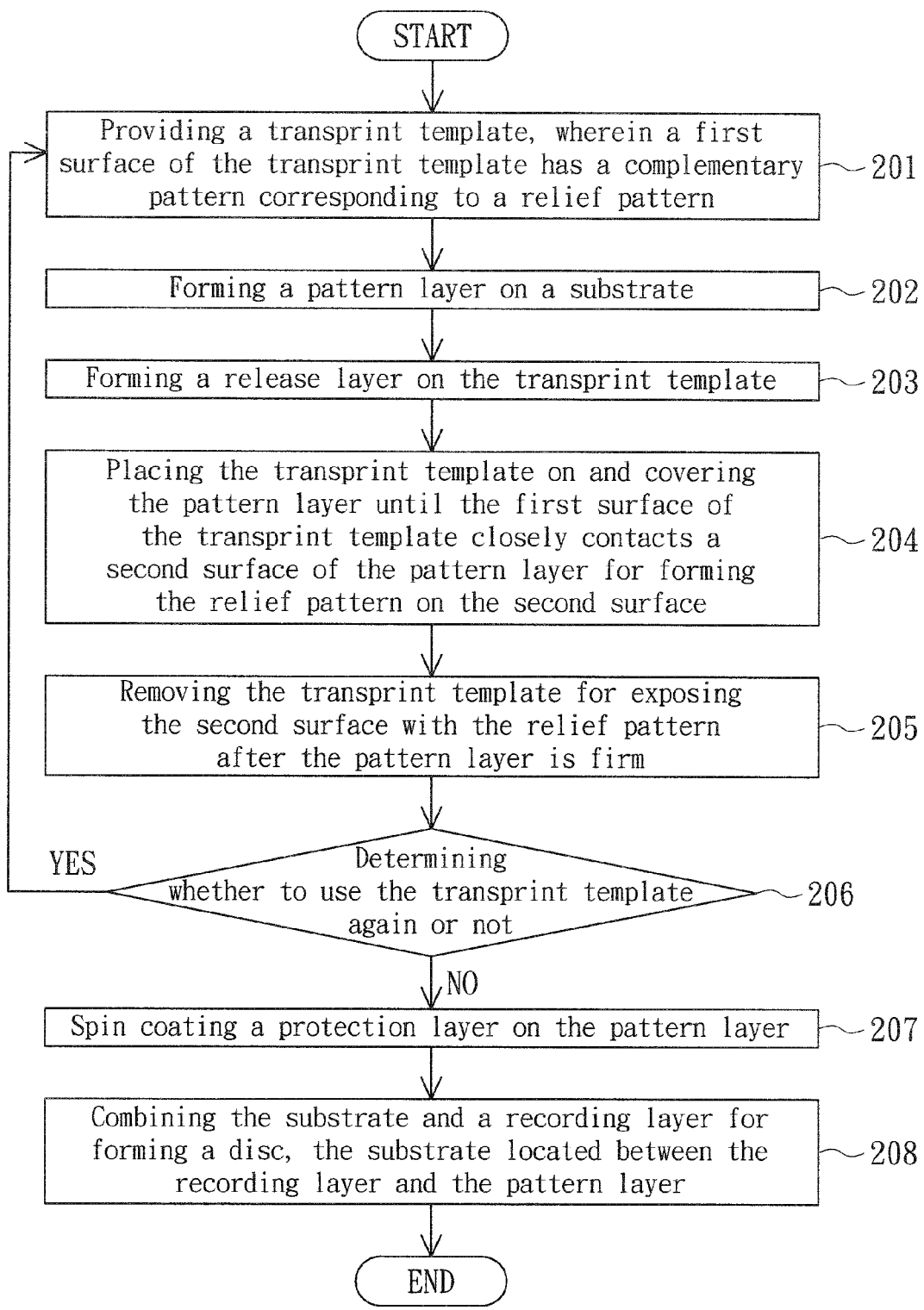
FIG. 2 is a flow chart of a transprint method of a disc having a relief pattern according to the first embodiment of the present invention.

The transprint method of the disc 100 having a relief pattern is described in details as follow. Please refer to FIG. 2. FIG. 2 is a flow chart of the transprint method of a disc having a relief pattern according to the first embodiment of the present invention. In the step 201, a transprint template 430 is provided wherein a first surface 430a of the transprint template 430 has a complementary pattern corresponding to the relief pattern 132.

Figure 3:
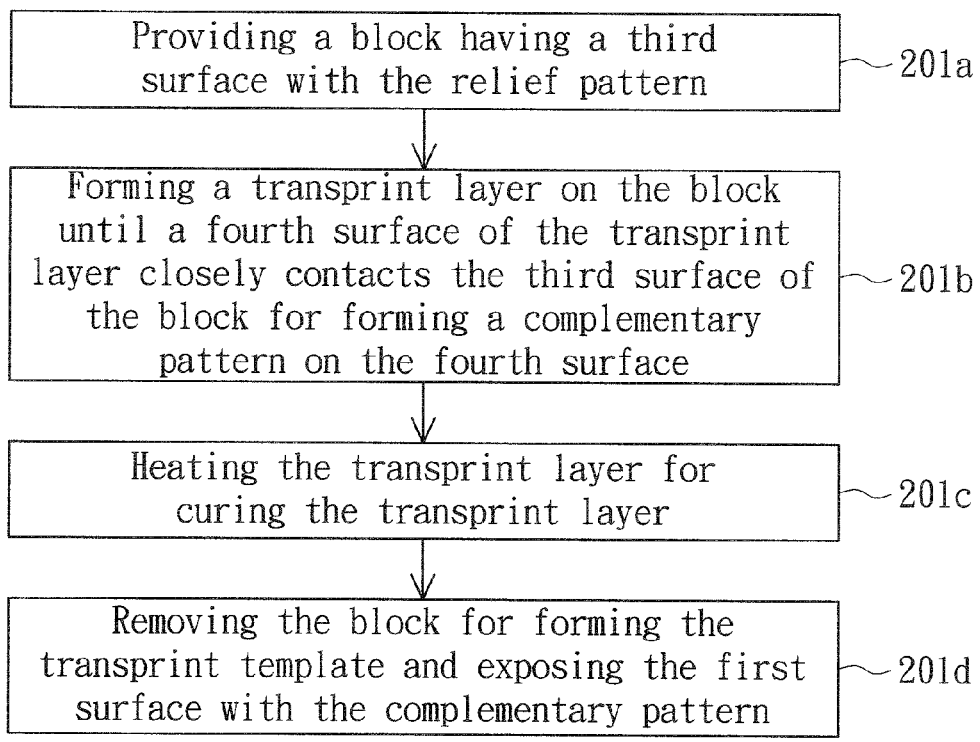
FIG. 3 is a flow chart of the details of a step 204 in FIG. 2.
Figure 4:
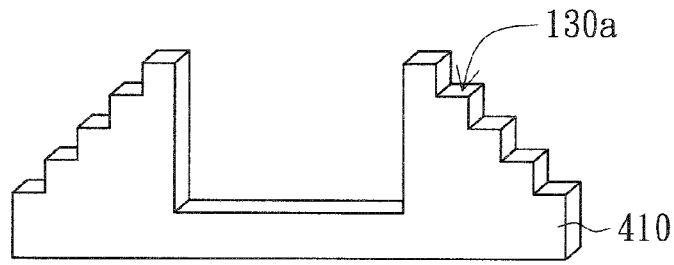
FIG. 4 illustrates a block of the transprint template according to the first embodiment of the present invention.

Please refer to FIG. 3 and FIG. 4 at the same time. FIG. 3 is a flow chart of the details of the step 201 in FIG. 2. FIG. 4 illustrates a block of the transprint template according to the first embodiment of the present invention. In the step 201a, the block 410 having a third surface 410a with the relief pattern 132 is provided. In the present embodiment, the preferred forming method of the relief pattern 132 of the block 410 is transforming the pattern to be printed into a gray-level pattern first. Then, the relief pattern 132 with different thickness is formed on the block 410 by laser. In the present embodiment, the material of the block 410 is silica glass or metal for example.

Figure 5:
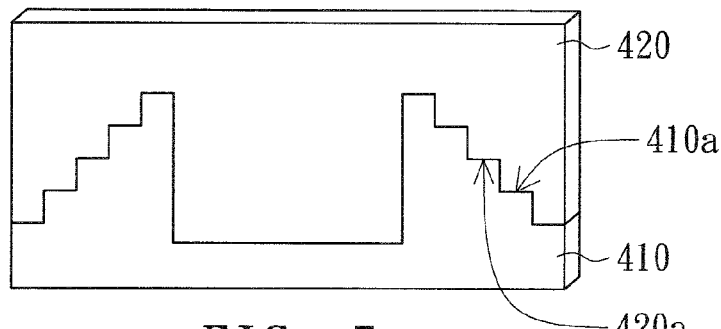
FIG. 5 illustrates the step of forming a transprint layer on the block in FIG. 4.

Next, please refer to FIG. 5. FIG. 5 illustrates the step of forming a transprint layer on the block in FIG. 4. In the step 201b, the transprint layer 420 is formed on the block 410, so that a fourth surface 420a of the transprint layer 420 closely contact the third surface 410a of the block 410. As a result, the fourth surface 420a has a complementary pattern corresponding to the relief pattern 132. In the present embodiment, the material of the transprint layer 420 is silicone polymer for example. Preferably, the material of the transprint layer 420 is polydimethylsiloxane (PDMS). Furthermore, PDMS is a transparent material which has a flexible characteristic. Also, PDMS is a thermosetting material. In this step, proper pressure P is applied to the transprint layer 420, so that the fourth surface 420a of the transprint layer 420 completely contacts the third surface 410a of the block 410 closely.

Afterward, in the step 201c, the transprint layer 420 is heated for curing the transprint layer 420. In the present embodiment, the material of the transprint layer 420 is a thermosetting material for example. Therefore, the transprint layer 420 is cured by heating in following curing step.

Figure 6:
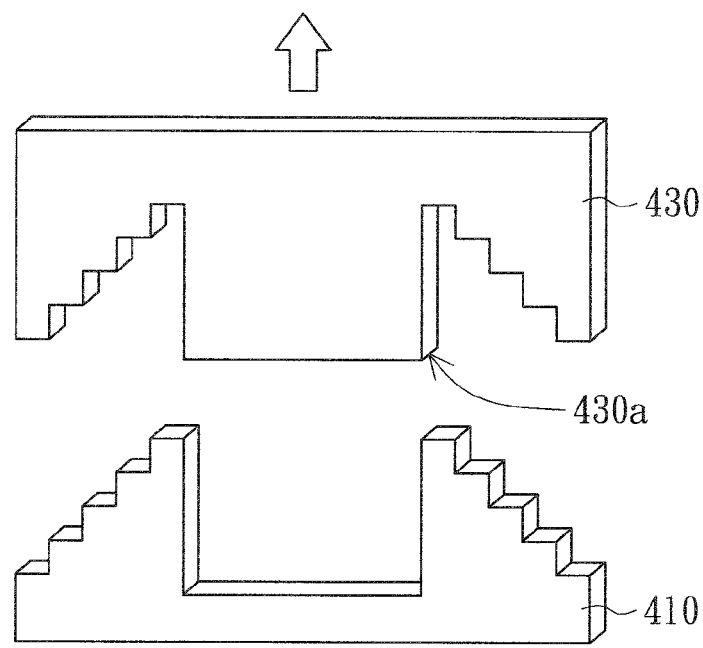
FIG. 6 illustrates the step of removing the block in FIG. 5.

Please refer to FIG. 6. FIG. 6 illustrates the step of removing the block in FIG. 5. Subsequently, in the step 201d, the block 410 is removed for forming the transprint template 430 and exposing the first surface 430a having the complementary pattern. In the present embodiment, after cured and cooled, the transprint layer 420 is slowly peeled off from the block 410 for forming the transprint template 430.

Figure 7:
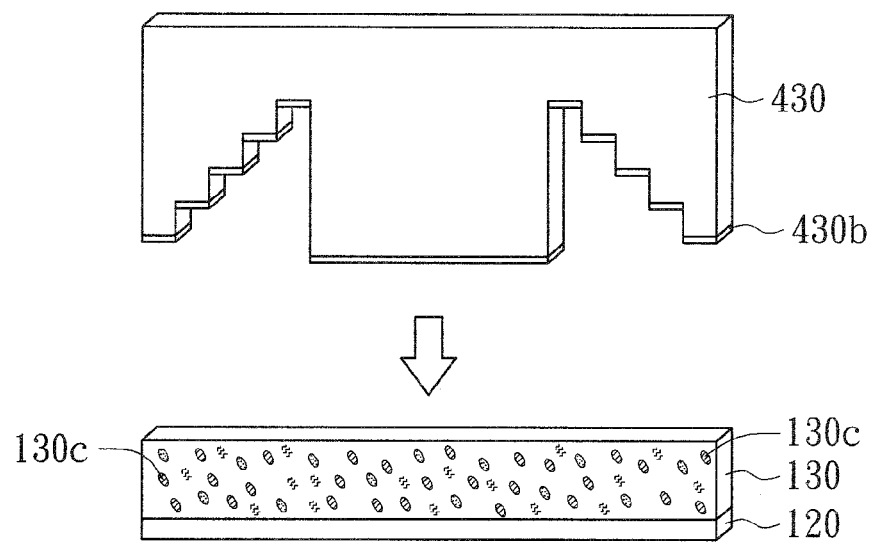
FIG. 7 shows the step of placing the transprint template onto the substrate.

Please refer to FIG. 2 and FIG. 7 at the same time. FIG. 7 shows the step of placing the transprint template onto the substrate. Later, in the step 202 in FIG. 2, the pattern layer 130 is formed on the substrate 120. In the present embodiment, the pattern layer 130 is preferably formed by spin coating or molding. Moreover, the material of the pattern layer 130 preferably is a photosensitive material. The pattern layer 130 includes several pigment microcapsules 130c. Each pigment microcapsule 130c includes a pigment. The pigment microcapsules can have different color pigments from others.

Thereon, in a step 203, a release layer 430b is formed on the transprint template 430, so that the transprint template 430 is easily removed from the cured pattern layer 130. In the present embodiment, the release layer 430b is a surfactant for example.

Subsequently, in the step 204, the transprint template 430 is placed on and covers the pattern layer 130 until the first surface 430a of the transprint template 430 closely contacts the second surface 130b of the pattern layer 130 so as to form the relief pattern 132 on the second surface 130b.

Figure 8:
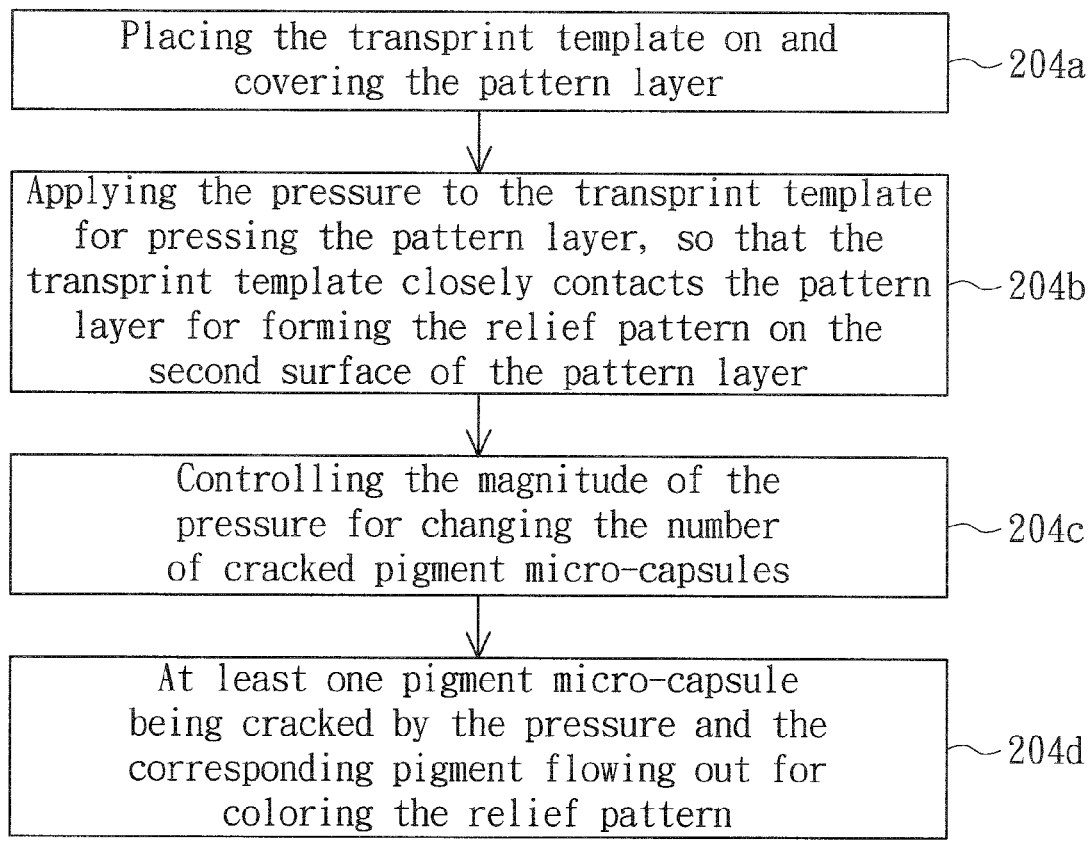
FIG. 8 is a flow chart of the details of the step 204 in FIG. 2.
Figure 9:
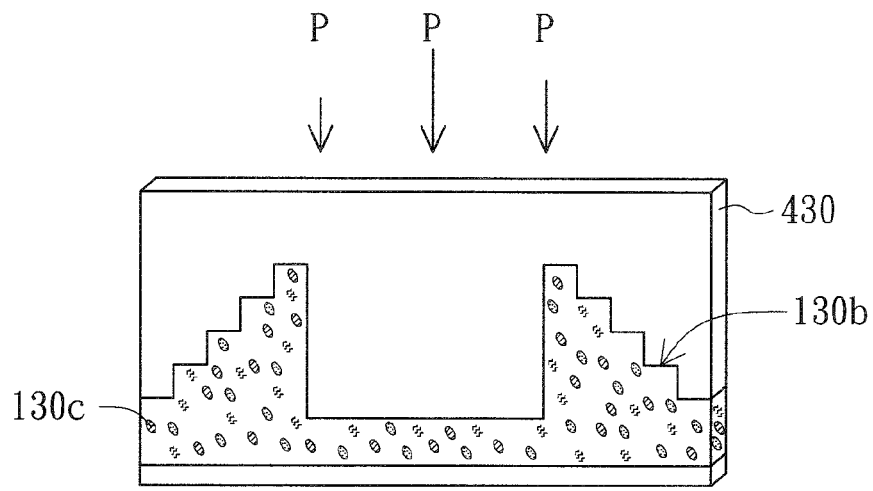
FIG. 9 illustrates the step of the transprint template closely contacting the substrate.

Please refer to FIG. 8 and FIG. 9 at the same time. FIG. 8 is a flow chart of the details of the step 204 in FIG. 2. FIG. 9 illustrates the step of the transprint template closely contacting the substrate. Then, in a step 204a, the transprint template 430 is placed on and covered the pattern layer 130. Afterward, in the step 204b, pressure P is applied to the transprint template 430 for pressing the pattern layer 130, so that the transprint template 430 closely contacts the pattern layer 130. As a result, the relief pattern 132 is formed on the second surface 130b of the pattern layer 130.

Next, in the step 204c, the magnitude of the pressure P is controlled to change the number of cracked pigment microcapsules. In the present embodiment, the material of the pigment microcapsules is the material which is cracked when applied to the pressure P for example such that the pigment in the pigment microcapsules flows out accordingly. Preferably, the pressure needed to crack the pigment microcapsules with different colors is different. In other words, the pigment microcapsules with needed color can be cracked via controlled the pressure P which applied to the transprint template 430. Furthermore, in the present embodiment, the material of the transprint template 430 is preferably flexible soft silicone polymer. Because the transprint template 430 is able to withstand different pressure P in different portions, the magnitude of the pressure P can be controlled.

Later, in the step 204d, at least a pigment microcapsule 130c is cracked due to pressure P, and the corresponding pigment flows out for coloring the relief pattern 132.

Figure 10:
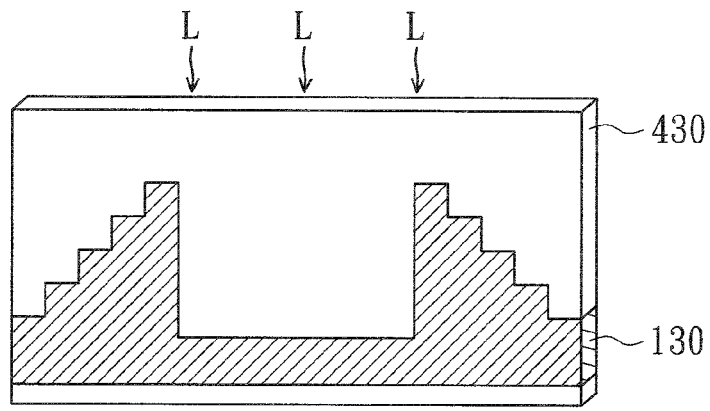
FIG. 10 illustrates the step of curing the pattern layer in FIG. 9.

In the step 205, the transprint template 430 is removed for exposing the second surface 130b with the relief pattern 132 after the patterned layer 130 is firm. Please also refer to both FIG. 2 and FIG. 10 at the same time. FIG. 10 illustrates the step of curing the pattern layer in FIG. 9. In the present embodiment, the material of the transprint template 430 is preferably a transparent material, so that ultraviolet L is able to transmit through the transprint template 430 and cure the pattern layer 130. In the present embodiment, the material of the pattern layer 130 is a photosensitive material for example. The photosensitive material is cured by ultraviolet irradiation L.

Figure 11:
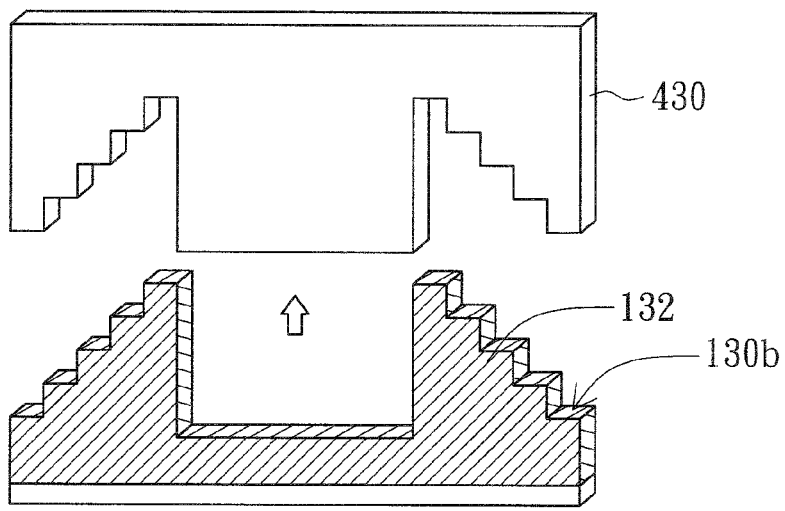
FIG. 11 illustrates the step of removing the transprint template in FIG. 10.

Next, please refer to FIG. 11. FIG. 11 illustrates the step of removing the transprint template in FIG. 10. Thereon, the transprint template 430 is removed for exposing the second surface 130b with the relief pattern 132, In the step 206, it is determined whether to use the transprint template 430 again or not. If yes, then the method goes to the step 201 and repeats the step 201-206. If no, then the method goes to a step 208.

Figure 12:
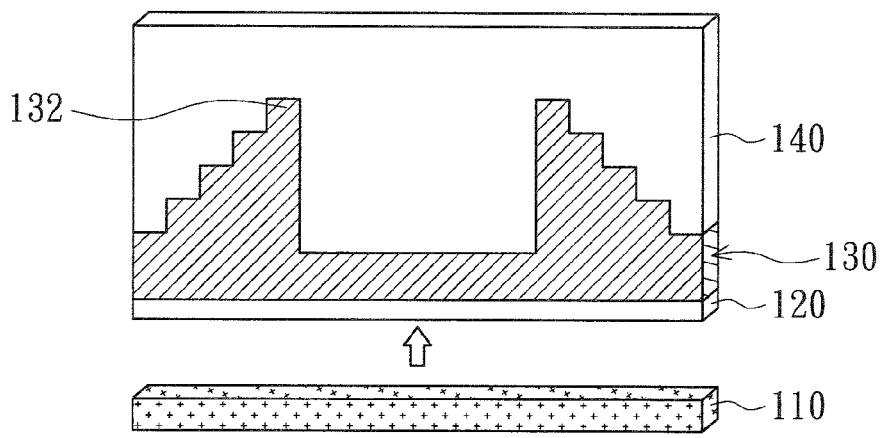
FIG. 12 illustrates the step of spin coating the protection layer on the pattern layer in FIG. 11.

Please refer to FIG. 12. FIG. 12 illustrates the step of spin coating the protection layer on the pattern layer in FIG. 11. In the step 207, the protection layer 140 is formed on the pattern layer 130 by spin coating. In the present embodiment, the material of the protection layer 140 is preferably transparent photosensitive UV laquer which is cure rapidly and scratch-proof. Therefore, the relief pattern 132 is protected more effectively.

Subsequently, in the step 208, the substrate 120 and a recording layer 110 are combined. The substrate 120 is located between the recording layer 110 and the pattern layer 130 for forming the disc 100.

Second Embodiment

Figure 13:
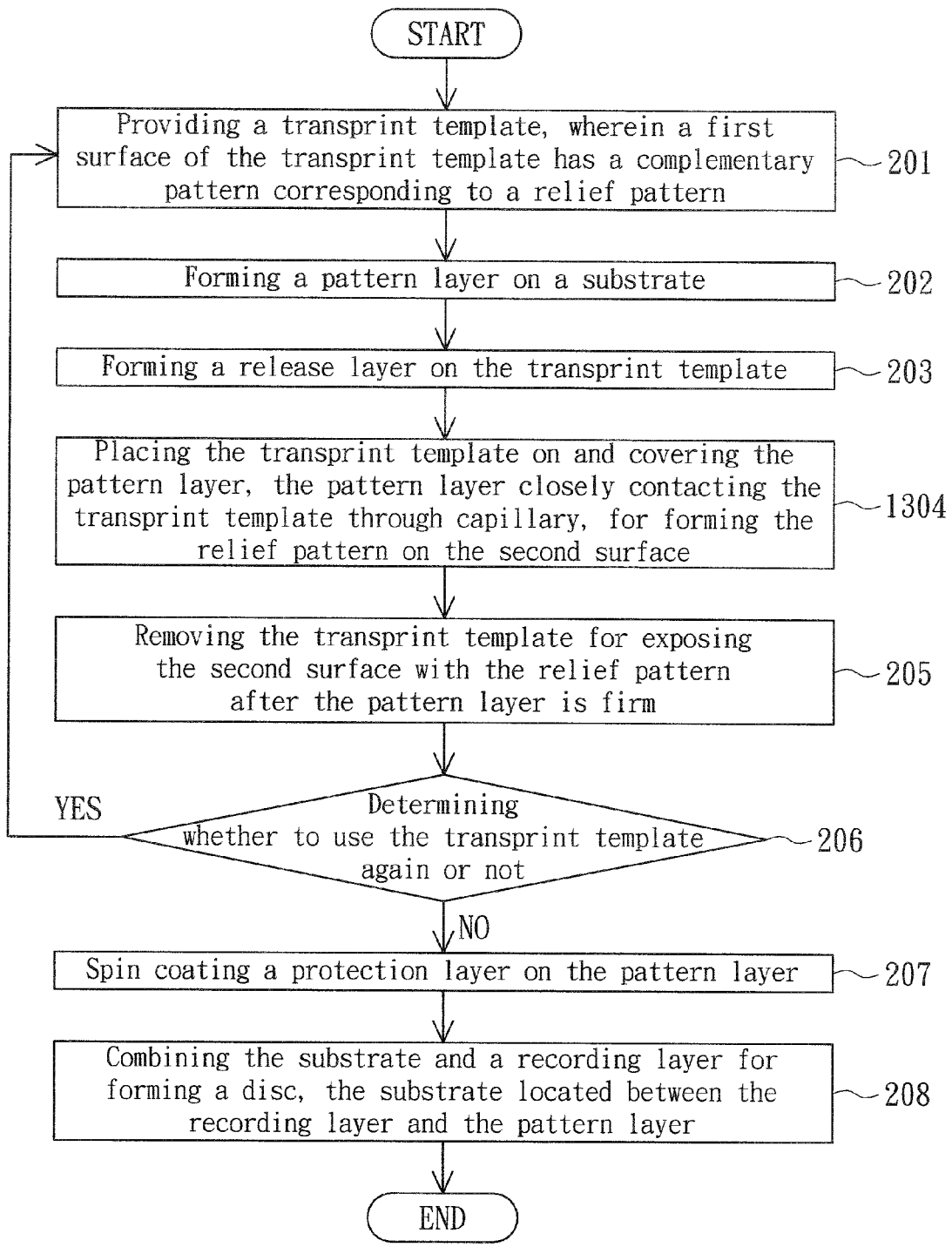
FIG. 13 is a flow chart of a transprint method of a disc having a relief pattern according to a second embodiment of the present invention.

Please refer to FIG. 13. FIG. 13 is a flow chart of a transprint method of a disc having a relief pattern according to a second embodiment of the present invention. In both the first and the second embodiments, the relief pattern 132 is transprinted on the substrate 120 of the disc 100 through the transprint template 430. The first embodiment and the second embodiment are different in the transprint method of the transprint template 430. The same parts are not described repeatedly. In the first embodiment, the pressure P is applied to the transprint template 430, so that the pattern layer 130 closely contacts the transprint template 430, as shown in FIG. 9.

Figure 14:
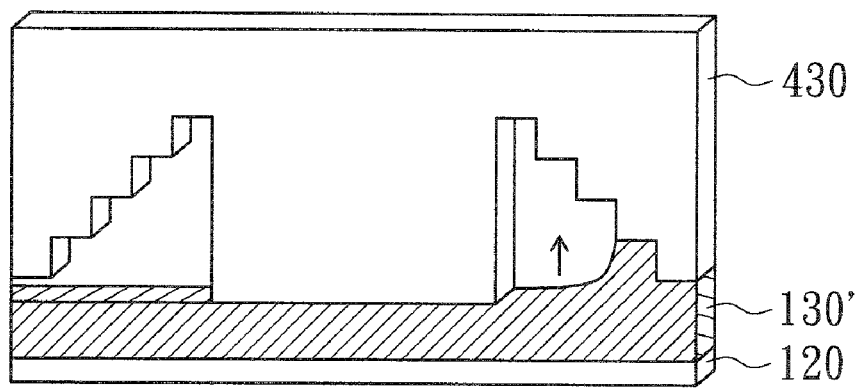
FIG. 14 illustrates the step of closely combining the pattern layer and the transprint template through capillarity according to the second embodiment of the present invention.
Figure 15:
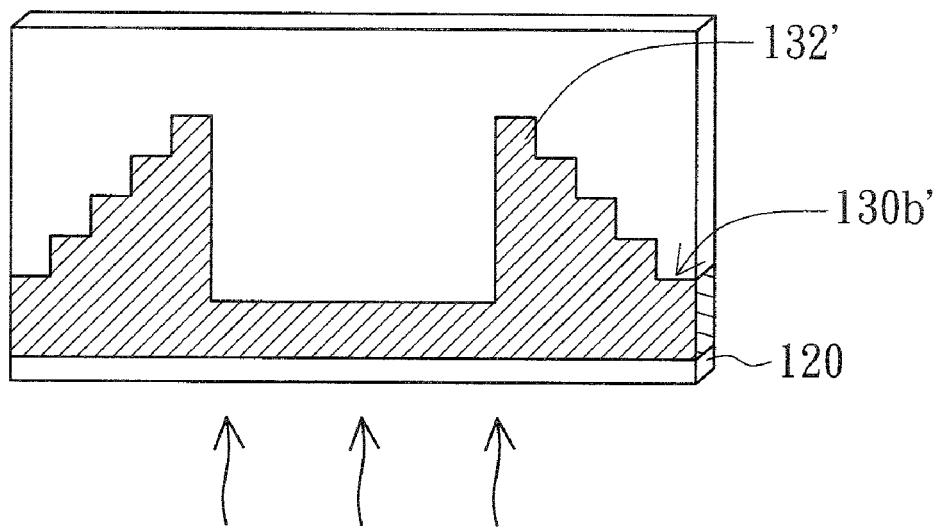
FIG. 15 illustrates the step of curing the pattern layer in FIG. 14.

Please refer to both FIG. 14 and FIG. 15 at the same time. FIG. 14 illustrates the step of closely combining the pattern layer and the transprint template through capillarity according to the second embodiment of the present invention. FIG. 15 illustrates the step of curing the pattern layer in FIG. 14. In the step 1304 in FIG. 13, the transprint template 430 is placed on and covered the pattern layer 130', and the pattern layer 130' closely contacts the transprint template 430 by capillarity. As a result, the relief pattern 132' is formed on the second surface 130b'. In the present embodiment, the pattern layer 130' can be formed on the substrate 120 by spin coating or can be formed between the transprint template 430 and the substrate 120 by mold filling for example. In the present embodiment, the pattern layer 130' includes a pigment with a specific color. This color can be different according to the practical application and is not limited thereto.

In a relief pattern of a disc and the transprint method thereof according to the aforementioned embodiments of the present invention, the relief pattern is transprinted to the pattern layer through the transprint template for patterning the pattern layer. The transprint method can form the relief pattern on the disc for provided the relief pattern on the disc. Therefore, the surface of the disc can is more stereoscopic visually and more impressed in visual enjoyment. Furthermore, the magnitude of the pressure can be controlled to break the corresponding pigment microcapsules so that the relief pattern is more colorful, which can stimulate consumers' interesting in purchasing discs.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transprint method for transprinting a relief pattern on a substrate of a disc, wherein the method comprises:
    (a) providing a transprint template, wherein a first surface of the transprint template having a complementary pattern corresponding to the relief pattern;
    (b) forming a pattern layer on the substrate;
    (c) placing the transprint template on and covering the pattern layer until the first surface of the transprint template closely contacts a second surface of the pattern layer, for forming the relief pattern on the second surface; and
    (d) removing the transprint template for exposing the second surface with the relief pattern after the patterned layer is firm,
    wherein the pattern layer comprises a plurality of pigment microcapsules, each pigment microcapsule comprising a pigment, the color of the pigment of each pigment microcapsule being different, wherein the step (c) comprises:
    (c1) applying a pressure to the transprint template for pressing the pattern layer; and
    (c2) cracking at least one of the pigment microcapsules by the pressure so the corresponding pigment flows out, for displaying colors of the relief pattern.

2. The method according to claim 1, wherein the step (c2) comprises:
    controlling the magnitude of the pressure for controlling the number of cracked pigment microcapsules, so that the relief pattern has different colors.

3. The method according to claim 1, wherein the step (c) comprises:
    the pattern layer closely contacting the transprint template through capillarity so as to form the relief pattern on the second surface.

4. The method according to claim 1, wherein the pattern layer is made of a photosensitive polymer, the step (d) comprising:
    curing the photosensitive polymer by ultraviolet irradiation.

5. The method according to claim 1, wherein between the steps (b) and (c), the method further comprising:
    (e) forming a release layer on the transprint template, so that the transprint template is easily removed from the cured pattern layer.

6. The method according to claim 1 further comprising:
    (f) spin coating a protection layer on the pattern layer.

7. The method according to claim 1 further comprising:
    (g) combining the substrate and a recording layer for forming the disc, wherein the substrate located between the recording layer and the pattern layer.

8. The method according to claim 1 further comprising:
    (h) using the transprint template again and performing steps (b)-(d).

9. The method according to claim 1, wherein the step (a) further comprises:
    (a1) providing a block, a third surface of the block having the relief pattern;
    (a2) forming a transprint layer on the block until a fourth surface of the transprint layer closely contacts the third surface of the block, so that the complementary pattern is formed on the fourth surface;
    (a3) heating the transprint layer for curing the transprint layer; and
    (a4) removing the block for forming the transprint template and exposing the first surface having the complementary pattern.

10. The method according to claim 9, wherein the transprint layer is a thermosetting polymer layer.

11. The method according to claim 9, wherein the transprint layer is a soft flexible silicone polymer layer.

12. A disc having a relief pattern, the disc comprising:
    a recording layer;
    a substrate disposed on the recording layer; and
    a pattern layer disposed on the substrate, wherein the pattern layer having a surface with different thickness for forming a relief pattern, wherein the pattern layer comprises a plurality of pigment microcapsules, each pigment microcapsule comprising a pigment, wherein some of the pigment microcapsules are cracked, and corresponding pigments of the cracked microcapsules flow out for displaying the colors of the relief pattern.

13. The disc according to claim 12 further comprising:
    a protection layer spin coated on the pattern layer for protecting the relief pattern.

14. The disc according to claim 13, wherein the protection layer is a transparent photosensitive polymer.

15. The disc according to claim 12, wherein the pattern layer is a photosensitive polymer.

* * * * *